(12) United States Patent
Sanderson

(10) Patent No.: US 7,666,384 B2
(45) Date of Patent: Feb. 23, 2010

(54) STABLE CHLORINE DIOXIDE TABLET

(76) Inventor: William D. Sanderson, 2053 Fillmore St. #101, San Francisco, CA (US) 94123

( * ) Notice: Subject to any disclaimer, the term of this patent is extended or adjusted under 35 U.S.C. 154(b) by 20 days.

(21) Appl. No.: 12/015,962

(22) Filed: Jan. 17, 2008

(65) Prior Publication Data

US 2009/0185970 A1    Jul. 23, 2009

(51) Int. Cl.
*C01B 11/02* (2006.01)
(52) U.S. Cl. ............. 423/477; 252/187.21; 252/187.23; 252/187.33
(58) Field of Classification Search ................ 423/477; 252/187.21, 187.23, 187.33
See application file for complete search history.

(56) References Cited

U.S. PATENT DOCUMENTS

| | | |
|---|---|---|
| 3,726,062 A | 4/1973 | Hungate |
| 3,804,329 A | 4/1974 | Martner |
| 4,456,511 A | 6/1984 | Fisher |
| 4,738,593 A | 4/1988 | Reifschneider |
| 4,746,466 A | 5/1988 | Takahashi |
| 4,846,856 A | 7/1989 | Burger |
| 4,874,489 A | 10/1989 | Callerame |
| 4,877,500 A | 10/1989 | Callerame |
| 5,006,326 A | 4/1991 | Mayurnik |
| 5,091,166 A | 2/1992 | Engstrom |
| 5,091,167 A | 2/1992 | Engstrom |
| 5,110,580 A | 5/1992 | Rosenblatt |
| 5,240,829 A * | 8/1993 | Carmen et al. ............ 435/2 |
| 5,300,260 A | 4/1994 | Keshet |
| 5,614,151 A | 3/1997 | LeVay |
| 5,919,374 A | 7/1999 | Harvey |
| 6,171,558 B1 | 1/2001 | Simpson |
| 6,197,215 B1 | 3/2001 | Pitochelli |
| 6,328,909 B1 * | 12/2001 | Kross et al. ............ 252/187.21 |
| 6,363,734 B1 | 4/2002 | Aoyagi |
| 6,602,442 B1 | 8/2003 | Pitochelli |
| 6,676,850 B2 | 1/2004 | Speronello |
| 6,699,404 B2 | 3/2004 | Speronello |
| 6,962,714 B2 | 11/2005 | Hei |
| 7,087,190 B2 | 8/2006 | Hei |
| 2002/0192110 A1 | 12/2002 | Barlick |
| 2003/0127535 A1 | 7/2003 | Adiga |
| 2003/0152619 A1 | 8/2003 | Stevens |
| 2003/0180384 A1 | 9/2003 | Koermer |
| 2004/0022675 A1 | 2/2004 | An |
| 2004/0035803 A1 | 2/2004 | Cronan |
| 2004/0135116 A1 | 7/2004 | Speronello |
| 2005/0013878 A1 | 1/2005 | Mingzhong |
| 2005/0072308 A1 | 4/2005 | Aoyagi |
| 2005/0079124 A1 | 4/2005 | Sanderson |
| 2005/0155936 A1 | 7/2005 | Martin |
| 2005/0249658 A1 | 11/2005 | Tarbet |
| 2006/0013751 A1 | 1/2006 | Martin |
| 2006/0016765 A1 | 1/2006 | DiPietro |
| 2006/0018940 A1 | 1/2006 | DiPietro |
| 2006/0115388 A1 | 6/2006 | Sanderson |
| 2006/0197058 A1 | 9/2006 | Martin |
| 2006/0216223 A1 * | 9/2006 | DiMascio ............ 423/477 |

FOREIGN PATENT DOCUMENTS

| | | |
|---|---|---|
| EP | 0414893 | 3/1991 |
| EP | 0581550 | 12/1997 |
| FR | 2656860 | 7/1991 |
| FR | 2697164 | 4/1994 |
| JP | 02261514 | 10/1990 |
| JP | 04300201 | 1/1992 |
| JP | 11207124 | 8/1999 |
| JP | 2000161727 | 6/2000 |
| JP | 2000202227 | 7/2000 |
| JP | 2000202333 | 7/2000 |
| JP | 2001033070 | 2/2001 |
| WO | 03055797 | 7/2003 |
| WO | 2004054685 | 12/2003 |
| WO | 2004089081 | 4/2004 |
| WO | 2005016011 | 8/2004 |
| WO | 2006060563 | 12/2005 |
| WO | 2006020247 | 2/2006 |
| WO | 2007078838 | 7/2007 |
| WO | 2007014996 | 12/2007 |
| WO | 2007149906 | 12/2007 |

OTHER PUBLICATIONS

Cosson, et. al., "Photodeposition of Chlorine Dioxide and Sodium Chlorite in Aqueous Solution by Irradiation with Ultraviolet Light," In. Eng. Chem. Res. 1994, 33, pp. 1468-1475.

* cited by examiner

*Primary Examiner*—Ngoc-Yen M Nguyen
(74) *Attorney, Agent, or Firm*—Jeffrey S. Melcher; Manelli Denison & Selter, PLLC

(57) ABSTRACT

Provided is a stable solid composition that produces chlorine dioxide upon contact with water.

12 Claims, No Drawings

STABLE CHLORINE DIOXIDE TABLET

FIELD OF THE INVENTION

The invention relates to a stable solid composition which produces chlorine dioxide upon contact with water.

BACKGROUND

Chlorine dioxide is a highly reactive yellowish-green gas that produces useful aqueous solutions in a number of applications such as disinfection, sterilization, and odor control. It is a potent antimicrobial agent, bleaching agent, and as a germicide has found increasing receptivity of its use in municipal and drinking water treatment, cooling towers, and food processing.

Recent regulatory approvals have led to growing acceptance of its use in reducing pathogens in food processing applications such as poultry chill water tanks, beef and pork carcasses washes, and raw agricultural commodities.

Chlorine dioxide has many advantages over traditional chlorine-based biocides due to its higher oxidation potential and greater selectivity towards bacterial cell membranes. However, several drawbacks have limited the implementation of chlorine dioxide where its superior safety and environmental profile would benefit a wide variety of industries.

The biggest disadvantage of using chlorine dioxide is that it must be produced at the-point-of use, i.e. on demand. Chlorine dioxide gas is prohibited from transportation. See 49 CFR 172.101. It is explosive in air at concentrations of about 10% and has a low threshold limit value (TLV) classification by OSHA of 0.1 ppm to workers.

Chlorine dioxide cannot be compressed and stored, as can chlorine, and aqueous solutions of chlorine dioxide rapidly degrade through evaporation and sun light. Aqueous chlorine dioxide chemistry is highly complex and often unwanted side reactions occur which yield lower and higher valent oxy-chloro species such chloride, chlorite, and chlorate. As a result of these limitations, it must be produced at the-point-of use.

The manufacture and transportation of solid chlorine dioxide tablets and powders presents serious safety and stability challenges. The precursors are hydroscopic and deliquescent at high relative humidity, requiring expensive desiccant systems to maintain the relative humidity below 10% in material handling operations. The main ingredient sodium chlorite is combustible in the presence of organic materials at temperatures greater than 150° C. This means that there are maximum allowable limits to the amount of material that can be packaged together in a single package. Furthermore US DOT regulations do not permit the aircraft transport of solid mixtures of activated sodium chlorite (UN 3121 Packing Group I) within the United States.

Chlorine dioxide solid compositions are further disadvantaged in that they are classified as oxidizers and are thus a fire hazard. They must be specially labeled according to UN and DOT regulations and are subject to shipping and storage restrictions. Example hazard ratings of ingredients in various chlorine dioxide release formulations: Sodium chlorite (UN hazard class 5.1-oxidizer); sodium dichloroisocyanurate (UN hazard class 5.1-oxidizer); sodium bisulfate (UN hazard class 8.0-corrosive solid. This disadvantage is discussed in U.S. Pat. No. No. 6,602,442 in column 7, lines 4-58.

A means for building fire retardancy into an oxidizing formulation is discussed in published application WO 2004/089081 A2. The application refers to formulations containing biocide compounds, such as trichloro-isocyanuric acid, which are admixed with an alkaline silicate and boric compounds to form a boro-silicate glass when heated. The boro-silicate glass reduces the combustive properties of the mixture.

An inverse relationship exists between stability and yield, where the highest yield compositions have the lowest stability. High yield compositions such as those described in U.S. Pat. No. 6,699,404 and marketed by BASF under the trademark Aseptrol® must be individually packaged at very low humidity (<10% relative humidity) to prevent moisture from prematurely releasing chlorine dioxide. The presence of humidity in the air prematurely releases chlorine dioxide gas as evidenced by the odor of chlorine dioxide and the 'yellowing' of the product or packaging material. Additionally, the composition in US '404 contains sodium dichloroisocyanurate an organic chlorine donor, which contributes to the low temperature stability of this formulation.

U.S. Pat. No. 6,699,404 describes solid chlorine dioxide releasing "massive bodies," which comprise a mixture of granular particulate ingredients where the size of the particles is substantially smaller than the size of the massive body. The massive body is formed from the mixture of particulate ingredients by compression and is essentially a large tablet. The tablets releases chlorine dioxide when added to water.

U.S. Pat. No. 6,602,442 describes a "dry composition" comprising lithium hypochlorite, sodium chlorite, and sodium hydrogen sulfate. Although this mixture was found to very soluble and rapidly yield chlorine dioxide upon addition to water, a substantial amount of chlorine gas is undesirably released since chlorine is produced above its solubility in water. See column 2, line 55-56 of this patent. Furthermore, the stability of the dry mixture is limited, especially in high humidity environments. These limitations would limit the addition of large amounts to water since the excess chlorine production could cause the mixture to "flash".

Current water treatment methods employing chlorine dioxide require that the precursors be activated at high concentration, such as 1000 to 3000 ppm, in a smaller container and then diluted into a larger volume of water to yield a desired working concentration, such as 0.5 to 50 ppm. However, the high concentration of chlorine dioxide generated in these methods is difficult and dangerous to handle. This problem is discussed in U.S. Pat. No. 6,602,442 at column 7, line 63 to column 8 line 12. Furthermore, if the precursors are added directly to a large volume of water in one step, it was found that the final concentration was unpredictable and significantly below what would be expected if complete conversion of chlorite to chlorine dioxide took place.

Solid-based chlorine dioxide compositions have been reviewed in U.S. Pat. No. 6,699,404 and WO07078838A3 which are incorporated herein by reference.

There is a need in the industry for a high yield chlorine dioxide composition that is resistant to moisture and heat. A high yield formulation is defined in this application to be where the active components of the composition (excluding binders, fillers, etc.) will release at least 10% of their mass as chlorine dioxide.

The formulation should be stable enough to allow tablets and or powders to be packaged at ambient moisture and temperature, ie. RH=50% Temp=25° C. The composition should also not contain additional hazardous chemicals such as chlorine donors or oxidizers that contribute negatively to the safety profile. Furthermore, the temperature stability of sodium chlorite is greatly reduced in the presence of organic materials such as sodium dichloroisocyanurate. This also applies to organic-based binders and fillers.

There is a need for a stable, solid composition that produces chlorine dioxide upon contact with water.

SUMMARY

An objective of the invention is to provide a stable, solid composition that produces chlorine dioxide upon contact with water.

Further objectives of the invention are to provide a composition that produces chlorine dioxide upon contact with water wherein:

The composition preferably is free of hydrocarbons.

The composition preferably is free of a hypohalous acid or salt of a hypohalous acid.

The composition preferably is free of persulfate, monopersulfate, perphosphates, peroxy-acids, peroxides, or other oxygen releasing compounds.

The composition preferably is free of oxidizing agents other than the required source of metal chlorite.

The composition preferably is free of nitrogen containing molecules.

The composition preferably has a combined molecular weight of solid active ingredients (excluding binders and fillers) not greater than 332 (ie. MW≦332) (sodium acid sulfate MW=138.08+sodium chlorite MW=90.44+sodium bromide MW=102.89)

The above objectives, and other objectives, are met by a composition for releasing chlorine dioxide comprising at least one metal chlorite, at least one metal bromide, and at least one solid acid.

DETAILED DESCRIPTION OF THE INVENTION

The composition for producing chlorine dioxide comprises at least one metal chlorite, at least one metal bromide, and at least one solid acid. The metal chlorite is preferably sodium chlorite. The metal chlorite is preferably present in an amount of about 10 to about 90% by weight. All weight percentages are based on the total weight of the composition unless otherwise stated.

Suitable examples of metal bromide include sodium bromide, potassium bromide, lithium bromide, calcium bromide, zinc bromide, magnesium bromide, with sodium bromide being preferred. The metal bromide is preferably present in an amount of from about 10 to about 90% by weight.

The solid acid can be any of those listed in U.S. Pat. No. 6,699,404, which is incorporated herein by reference. Specific suitable examples of the solid acid include sodium hydrogen sulfate, citric acid, malic acid, or tartaric acid, with sodium hydrogen sulfate being preferred. The solid acid is preferably present in an amount of from about 10 to about 90% by weight.

The solid composition can be produced in any desired shape or form. Preferably, the solid composition is formed into a tablet. The composition can include inactive ingredients, such as fillers, binders, coloring agents, and purfumes.

A surprising result is that chlorine dioxide was rapidly obtained at high yield without the use of an oxidizer, such as a halogen donor. It is well known in the art that addition of acid to sodium chlorite will release chlorine dioxide as shown below in Equation 1:

$$5\ NaClO_2 + 4\ H^+ = 4\ ClO_2 + 2\ H_2O + Cl^- + 5\ Na^+ \quad \text{(Equation 1)}$$

However, this reaction is slow and the theoretical maximum conversion ratio of sodium chlorite is 80%. Compare this with Equation 2.

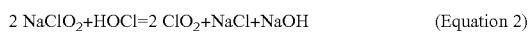

$$2\ NaClO_2 + HOCl = 2\ ClO_2 + NaCl + NaOH \quad \text{(Equation 2)}$$

This reaction is very fast and the conversion ratio of chlorite approaches 100%. However, in order to contribute hypochlorous acid, a solid chlorine donor with all of the negative stability aspects must be present in the formulation.

The present invention is able to achieve a relatively fast and high yield of chlorine dioxide by reacting only an acidic material and a bromide salt with sodium chlorite. This is a very surprising outcome, since it was previously believed to only be possible to achieve a rapid and high yield of chlorine dioxide with an oxidizing agent.

The exact chemical mechanism is not yet understood but, without being limited to any theory, is thought to be an autocatalytic reaction. The investigator theorizes that the bromide salt is first converted to bromine or hypobromous acid by the acidified chlorite ion, which functions as a low grade oxidizing agent. Subsequently, the oxidized form of bromine then oxidizes the chlorite ion to yield chlorine dioxide. This phenomenon is also evidenced by a color change from orange-brown to bright yellow-green that takes place in the solution. While the yield of chlorine dioxide is lower than if a chlorine-based oxidant is used, the increase in safety and stability more than compensates for this detriment.

The composition is preferably free of oxidizing agents other than the metal chlorite. Thus, the main reactive ingredients are the metal chlorite, the metal bromide, and the solid acid, which react upon contact with water to produce chlorine dioxide Preferably, no other active ingredients are present.

EXAMPLE 1

| | |
|---|---|
| Sodium chlorite | 3.0 gram |
| Sodium acid sulfate | 3.0 gram |
| Sodium bromide | 2.1 gram |

The composition was added to 1 liter of water and allowed to react for 15 minutes. A 10 ml aliquot was placed into a glass vial and read on a Hach spectrometer at 443 nm. The concentration of chlorine dioxide was 657 ppm @ pH 2.51. The yield of chlorine dioxide was expressed as a percentage of active ingredients (not including tablet binder): 0.657 grams chlorine dioxide produce/8.1 grams active ingredients of composition×100%=8.1% available chlorine dioxide.

EXAMPLE 2

| | |
|---|---|
| Sodium chlorite | 3.0 gram |
| Sodium acid sulfate | 2.5 gram |
| Sodium bromide | 2.1 gram |

The composition was added to 1 liter of water and allowed to react for 15 minutes. A 10 ml aliquot was placed into a glass vial and read on a Hach spectrometer at 443 nm. The concentration of chlorine dioxide was 548 ppm @ pH 2.51. Yield was 0.548 g/7.6 g×100%=7.2% available chlorine dioxide

EXAMPLE 3

| Sodium chlorite | 3.0 gram |
|---|---|
| Sodium acid sulfate | 3.0 gram |
| Sodium bromide | 2.1 gram |
| Inert tablet binder | 2.0 gram |

The above composition was placed into a tablet die and compressed at 40,000 lbs (18 metric tons) on a Carver Laboratory Tablet Press. The resulting tablet was placed into 1 liter of water and allowed to dissolve for 20 minutes. The resulting solution was 836 ppm chlorine dioxide @ pH 2.65. Yield was 10.32% available chlorine dioxide.

EXAMPLE 4 (COMPARATIVE)

| Sodium chlorite | 3.0 grams |
|---|---|
| Sodium acid sulfate | 3.0 grams |
| Inert tablet binder | 2.0 grams |

The above composition was pressed into a tablet as above. The tablet was added to 1 liter of water and allowed to dissolve for 20 minutes. The resulting solution was 412 ppm chlorine dioxide @ pH 2.38. Yield was 6.8% available chlorine dioxide.

EXAMPLE 5 (COMPARATIVE)

| Sodium chlorite | 3.0 grams |
|---|---|
| Sodium acid sulfate | 3.0 grams |

The above composition was added to 1 liter of water. The resulting solution was 68 ppm chlorine dioxide @ pH 2.26. Yield was 1.13% available chlorine dioxide.

The above examples and comparative examples clearly demonstrate that the presence of sodium bromide in the composition had a very positive impact on the yield of chlorine dioxide. This was a surprising result and reference to a bromide-enhancing effect has not been found in the literature by the investigator.

The invention claimed is:

1. A stable composition for releasing chlorine dioxide comprising:
    at least one metal chlorite;
    at least one metal bromide selected from the group consisting of sodium bromide, potassium bromide, or lithium bromide; and
    at least one solid acid source, wherein the composition is free of oxidizing agents other than the metal chlorite.

2. The composition for releasing chlorine dioxide according to claim 1, wherein the metal chlorite comprises sodium chlorite.

3. The composition for releasing chlorine dioxide according to claim 1, wherein the solid acid comprises at least one selected from the group consisting of sodium hydrogen sulfate, citric acid, malic acid, or tartaric acid.

4. The composition for releasing chlorine dioxide according to claim 1, wherein the metal chlorite is present at about 10 to about 90% by weight, the metal bromide is present at about 10 to about 90% by weight, and the solid acid is present at about 10 to about 90% by weight, all weight percents based on the total weight of the composition.

5. The composition for releasing chlorine dioxide according to claim 1, wherein the composition is in the form of a tablet.

6. The composition according to claim 1, wherein the composition is free of hydrocarbons.

7. The composition according to claim 1, wherein the composition is free of nitrogen containing compounds.

8. A method of making chlorine dioxide on demand comprising the steps of adding a composition consisting essentially of at least one metal chlorite, at least one metal bromide, at least one solid acid, and optionally binder materials to water, wherein the composition is free of oxidizers other than the metal chlorite, and wherein the metal bromide comprises at least one selected from the group consisting of sodium bromide, potassium bromide, or lithium bromide.

9. The method according to claim 8, wherein the metal chlorite comprises sodium chlorite.

10. The method according to claim 8, wherein the solid acid comprises at least one selected from the group consisting of sodium hydrogen sulfate, citric acid, malic acid, or tartaric acid.

11. The method according to claim 8, wherein the metal chlorite is present at about 10 to about 90% by weight, the metal bromide is present at about 10 to about 90% by weight, and the solid acid is present at about 10 to about 90% by weight, all weight percents based on the total weight of the composition.

12. The method according to claim 10, wherein the composition is in the form of a tablet.

* * * * *